(12) United States Patent
Kraft

(10) Patent No.: US 9,388,737 B2
(45) Date of Patent: Jul. 12, 2016

(54) AERO BOOST—GAS TURBINE ENERGY SUPPLEMENTING SYSTEMS AND EFFICIENT INLET COOLING AND HEATING, AND METHODS OF MAKING AND USING THE SAME

(71) Applicant: PowerPHASE LLC, Jupiter, FL (US)

(72) Inventor: Robert J. Kraft, Tequesta, FL (US)

(73) Assignee: POWERPHASE LLC, Jupiter, FL (US)

( * ) Notice: Subject to any disclaimer, the term of this patent is extended or adjusted under 35 U.S.C. 154(b) by 0 days.

(21) Appl. No.: 14/419,853

(22) PCT Filed: Oct. 3, 2013

(86) PCT No.: PCT/US2013/063177
§ 371 (c)(1),
(2) Date: Feb. 5, 2015

(87) PCT Pub. No.: WO2014/055717
PCT Pub. Date: Apr. 10, 2014

(65) Prior Publication Data
US 2015/0240713 A1 Aug. 27, 2015

Related U.S. Application Data

(60) Provisional application No. 61/744,822, filed on Oct. 4, 2012.

(51) Int. Cl.
F02C 1/00 (2006.01)
F02C 3/10 (2006.01)
F02C 7/12 (2006.01)
F02C 9/18 (2006.01)
F02C 7/08 (2006.01)
F01K 23/02 (2006.01)

(52) U.S. Cl.
CPC ... *F02C 3/10* (2013.01); *F02C 7/12* (2013.01); *F02C 9/18* (2013.01); *F01K 23/02* (2013.01); *F02C 7/08* (2013.01); *Y02E 20/16* (2013.01)

(58) Field of Classification Search
CPC .......... F02C 7/143; F02C 7/1435; F02C 7/08; F02C 7/10; F02C 6/02; F01K 23/02; F01K 23/10
See application file for complete search history.

(56) References Cited

U.S. PATENT DOCUMENTS 3,359,723 A 12/1967 Bohensky et al.
3,765,170 A * 10/1973 Nakamura .................. 60/39.17
(Continued)

FOREIGN PATENT DOCUMENTS

| WO | 2013116185 | 8/2013 |
|----|------------|--------|
| WO | 2014055717 | 4/2014 |
| WO | 2014066276 | 5/2014 |

OTHER PUBLICATIONS

U.S. Appl. No. 14/350,469, filed Apr. 8, 2014, 141 pages.
(Continued)

*Primary Examiner* — Gerald L Sung
(74) *Attorney, Agent, or Firm* — Lathrop & Gage LLP

(57) ABSTRACT

The invention relates generally to electrical power systems, including generating capacity of a gas turbine, and more specifically to pressurized air injection that is useful for providing additional electrical power during periods of peak electrical power demand from a gas turbine system power plant, as well as to inlet heating to allow increased engine turn down during periods of reduced electrical demand.

3 Claims, 4 Drawing Sheets

(56) References Cited

U.S. PATENT DOCUMENTS

| | | | |
|---|---|---|---|
| 3,831,373 A | 8/1974 | Flynt | |
| 4,147,024 A * | 4/1979 | Moellmann | 60/39.15 |
| 4,765,142 A | 8/1988 | Nakhamkin | |
| 4,870,816 A | 10/1989 | Nakhamkin | |
| 4,872,307 A | 10/1989 | Nakhamkin | |
| 4,885,912 A | 12/1989 | Nakhamkin | |
| 4,936,098 A | 6/1990 | Nakhamkin | |
| 5,212,942 A * | 5/1993 | Malohn | 60/784 |
| 5,347,806 A | 9/1994 | Nakhamkin | |
| 5,386,688 A | 2/1995 | Nakhamkin | |
| 5,758,485 A * | 6/1998 | Frutschi | 60/772 |
| 5,778,675 A | 7/1998 | Nakhamkin | |
| 5,845,479 A | 12/1998 | Nakhamkin et al. | |
| 5,845,481 A | 12/1998 | Briesch | |
| 5,934,063 A | 8/1999 | Nakhamkin | |
| 6,038,849 A | 3/2000 | Nakhamkin et al. | |
| 6,134,873 A | 10/2000 | Nakhamkin et al. | |
| 6,212,871 B1 | 4/2001 | Rakhmailov | |
| 6,244,037 B1 | 6/2001 | Nakhamkin et al. | |
| 6,276,123 B1 | 8/2001 | Chen et al. | |
| 6,305,158 B1 | 10/2001 | Nakhamkin et al. | |
| 7,389,644 B1 | 6/2008 | Nakhamkin | |
| 7,406,828 B1 | 8/2008 | Nakhamkin | |
| 7,614,237 B2 | 11/2009 | Nakhamkin | |
| 7,640,643 B2 | 1/2010 | Nakhamkin | |
| 7,669,423 B2 | 3/2010 | Nakhamkin | |
| 8,011,189 B2 | 9/2011 | Nakhamkin | |
| 8,261,552 B2 | 9/2012 | Nakhamkin | |
| 8,616,005 B1 | 12/2013 | Cousino, Sr. | |
| 8,863,519 B2 | 10/2014 | Kraft | |
| 2001/0000091 A1 | 4/2001 | Nakhamkin et al. | |
| 2002/0078689 A1 * | 6/2002 | Coleman et al. | 60/728 |
| 2002/0148227 A1 * | 10/2002 | Mackay | 60/772 |
| 2005/0087330 A1 | 4/2005 | Kang et al. | |
| 2005/0235625 A1 * | 10/2005 | Gericke et al. | 60/39.182 |
| 2006/0213183 A1 * | 9/2006 | Althaus | 60/274 |
| 2008/0104938 A1 * | 5/2008 | Finkenrath et al. | 60/39.5 |
| 2008/0134660 A1 * | 6/2008 | Finkenrath et al. | 60/39.52 |
| 2009/0200805 A1 | 8/2009 | Kim et al. | |
| 2011/0005228 A1 | 1/2011 | Yoshinari et al. | |
| 2011/0181050 A1 | 7/2011 | Dinu | |
| 2012/0036860 A1 | 2/2012 | Wettstein et al. | |
| 2013/0125525 A1 * | 5/2013 | Hein et al. | 60/39.182 |

OTHER PUBLICATIONS

U.S. Appl. No. 14/351,245, filed Apr. 11, 2014, 61 pages.
U.S. Appl. No. 14/329,340, filed Jul. 11, 2014, 76 pages.
U.S. Appl. No. 14/329,433, filed Jul. 11, 2014, 80 pages.
U.S. Appl. No. 14/462,000, filed Aug. 18, 2014, 54 pages.
U.S. Appl. No. 14/534,598, filed Nov. 6, 2014, 45 pages.
U.S. Appl. No. 62/055,247, filed Sep. 25, 2014, 27 pages.
Application No. PCT/US2013/034748, filed Mar. 31, 2013, Search Report and Written Opinion, dated Jun. 28, 2013, 15 pages.
Application No. PCT/US2013/063177, filed Oct. 3, 2013, Search Report and Written Opinion, dated Feb. 28, 2014, 15 pages.
Application No. PCT/US13/65998, filed Oct. 21, 2013, Search Report and Written Opinion, dated May 19, 2014, 18 pages.

* cited by examiner

AERO BOOST—GAS TURBINE ENERGY SUPPLEMENTING SYSTEMS AND EFFICIENT INLET COOLING AND HEATING, AND METHODS OF MAKING AND USING THE SAME

FIELD OF THE INVENTION

The invention relates generally to electrical power systems, including generating capacity of a gas turbine, and more specifically to pressurized air injection that is useful for providing additional electrical power during periods of peak electrical power demand from a gas turbine system power plant, as well as to inlet heating to allow increased engine turn down during periods of reduced electrical demand.

BACKGROUND OF THE INVENTION

Currently marginal energy is produced mainly by gas turbine, either in simple cycle or combined cycle configurations. As a result of load demand profile, the gas turbine base systems are cycled up during periods of high demand and cycled down or turned off during periods of low demand. This cycling is typically driven by the Grid operator under a program called active grid control, or AGC. Also, in many electrical markets, peak power demands occur when it is hottest outside. Gas turbines naturally loose power and efficiency at elevated ambient temperatures which further increases the number of gas turbines that must be run during peak periods. Unfortunately, because industrial gas turbines, which represent the majority of installed base, were designed primarily for base load operation, when they are cycled, a severe penalty is associated with the maintenance cost of that particular unit. For example, a gas turbine that is running base load could go through a normal maintenance once every three years, or 24,000 hours at a cost in the 2-3 million U.S. dollar range. That same cost could be incurred in one year for a plant that is forced to start up and shut down every day.

Currently these gas turbine plants can turn down to approximately 50% of their rated capacity. They do this by closing the inlet guide vanes of the compressor, which reduces the air flow to the gas turbine, also driving down fuel flow as a constant fuel air ratio is desired in the combustion process. Maintaining safe compressor operation, and compliance with emissions requirements, typically limit the level of turn down that can be practically achieved.

The safe compressor lower operating limit is improved in current gas turbines by introducing warm air to the inlet of the gas turbine, typically from a mid stage bleed extraction from the compressor. Sometimes, this warm air is also introduced into the inlet to prevent icing. In either case, when this is done, the work that is done to the air by the compressor is sacrificed in the process for the benefit of being able to operate the compressor safely to a lower flow, thus increasing the turn down capability and preventing icing of the inlet. This has a further negative impact on the efficiency of the system as the work performed on the air that is bled off is lost. Additionally, the combustion system also presents a limit to the system.

The combustion system usually limits the amount that the system can be turned down because as less fuel is added, the flame temperature reduces, increasing the amount of carbon monoxide (CO) emissions that are produced. The relationship between flame temperature and CO emissions is exponential with reducing temperature, consequently, as the gas turbine system gets near the flame temperature limit, the CO emissions spike up, so a healthy margin is kept from this limit. This characteristic limits all gas turbine systems to approximately 50% turn down capability, or, for a 100 MW gas turbine, the minimum power, or maximum turn down, that can be achieved is about 50%, or 50 MW. As the gas turbine mass flow is turned down, the compressor and turbine efficiencies fall off as well, causing an increase in heat rate of the gas turbine. Some operators are faced with this situation every day and as a result, as the load demand falls, their gas turbine plants hit their lower operating limit and they have to turn the gas turbines off, which costs them a tremendous maintenance cost penalty.

Another characteristic of a typical gas turbine is that as the ambient temperature increases, the power output from the gas turbine system goes down proportionately due to the linear effect of the reduced density as the temperature of air increases. Power output can be down by more than 10% from nameplate output during hot days, typically when peaking gas turbines are called on most to deliver power.

Another characteristic of typical gas turbines is that air that is compressed and heated in the compressor section of the gas turbine is ducted to different portions of the gas turbine's turbine section where it is used to cool various components. This air is typically called turbine cooling and leakage air (hereinafter "TCLA"), a term that is well known in the art with respect to gas turbines. Although heated from the compression process, TCLA air is still significantly cooler than the turbine temperatures, and thus is effective in cooling those components in the turbine downstream of the compressor. Typically 10% to 15% of the air that comes in the inlet of the compressor bypasses the combustor and is used for this process. Thus, TCLA is a significant penalty to the performance of the gas turbine system.

Another characteristic of many large frame engines used to generate power is that the RPM is fixed because the shaftline of the gas turbine is fixed to the generator and the generator must spin at a specific speed to generate electricity at a specific frequency, for example 3600 RPM for 60 HZ and 3000 RPM for 50 HZ. The term "shaftline" means the shaft of the gas turbine and the shaft of the generator and including any fixed ratio gearbox attached between those shafts, so that at all operating conditions the ratio of revolutions per minute (RPM) of the gas turbine shaft to the RPM of the generator shaft remains constant. In gas turbines that have free turbines or multiple turbine shafts within, this is not true. Consequently only one shaft of a multi-shaft gas turbine, the one tied to, or on the shaftline with, the generator, has to spin at a constant rpm. This is a significant consideration when injecting air upstream of the combustor.

On a multi-shaft engine, like the LM6000 for example, when the air is injected upstream of the combustor, the high pressure turbine actually speeds up which drives the high pressure compressor harder, which in turn induces more air flow through the gas turbine's low pressure compressor, and the compressor as a whole. Therefore, the increased airflow that is being injected upstream of the combustor is the injected air plus the additional flow that is induced in the gas turbine engine's core. Since the low pressure compressor is tied to the low pressure turbine (LPT) and generator, it spins at 3600 RPM (for a 60 HZ generator) and additional air flow goes through the LPT because of the reduced pressure between the high pressure compressor (HPC) and LPC. In other words, since the high pressure compressor is working harder and inducing flow through the low pressure compressor, the low pressure compressor does not need to work as hard to compress the air going to the combustor, so more of the energy that drives the low pressure turbine and the power turbine is available to drive the generator (or other load).

SUMMARY OF THE INVENTION

The present invention relates to improved electrical power systems and methods of using the same, including increasing the capacity of a gas turbine.

The current invention, which may be referred to herein as TurboPHASE™, provides several options, depending on specific plant needs, to improve the efficiency and power output of power plants using multi-shaft gas turbine engines, at low loads, and to reduce the lower limit of power output capability of such gas turbines while at the same time increasing the upper limit of the power output of the gas turbine, thus increasing the capacity and regulation capability of a new or existing gas turbine system.

One aspect of the present invention relates to methods and systems that allow running multi-shaft gas turbine systems to provide additional power quickly during periods of peak demand.

Yet another aspect of the present invention relates to methods and systems that allow gas turbine systems to be more efficiently turned down during periods of lowered demand.

One embodiment of the invention relates to a system comprising at least one existing gas turbine that comprises a low pressure compressor, a high pressure compressor, a combustor, a high pressure turbine, and a low pressure turbine, wherein a first shaft connects the low pressure compressor and the low pressure turbine, and a second shaft connects the high pressure compressor and the high pressure turbine, and further comprising an auxiliary compressor which is not the same as the low pressure compressor or the high pressure compressor.

An advantage of preferred embodiments of the present invention is the ability to efficiently increase the turn down capability of the gas turbine system during periods of lower demand and improve the efficiency and output of the gas turbine system during periods of high demand.

Another advantage of additional preferred embodiments of the present invention is the ability to efficiently increase the turn down capability of the gas turbine system during periods of low demand by using an auxiliary compressor driven by a fueled engine, the operation of which is independent of the electric grid.

Another advantage of other preferred embodiments of the present invention is the ability to increase the turn down capability of the gas turbine system during periods of low demand by using an auxiliary compressor driven by a fueled engine which produces heat that can be added to compressed air flowing to the gas turbine, from the auxiliary compressor.

Another advantage of additional preferred embodiments of the present invention is the ability to increase output of the gas turbine system during periods of high demand by using an auxiliary compressor which is not driven by power produced by the gas turbine system.

Another advantage of the present invention is the ability to incorporate selective portions of the embodiments described herein on existing gas turbines to achieve specific plant objectives.

Another advantage of another embodiment of the present invention is that because the incremental amount of compressed air can be added at a relatively constant rate over a wide range of ambient temperatures, the power increase achieved by the gas turbine is also relatively constant over a wide range of ambient temperatures.

Other advantages, features and characteristics of the present invention, as well as the methods of operation and the functions of the related elements of the structure and the combination of parts will become more apparent upon consideration of the following detailed description and appended claims with reference to the accompanying drawings, all of which form a part of this specification.

DETAILED DESCRIPTION OF THE PRESENT EMBODIMENT

Figure 1:
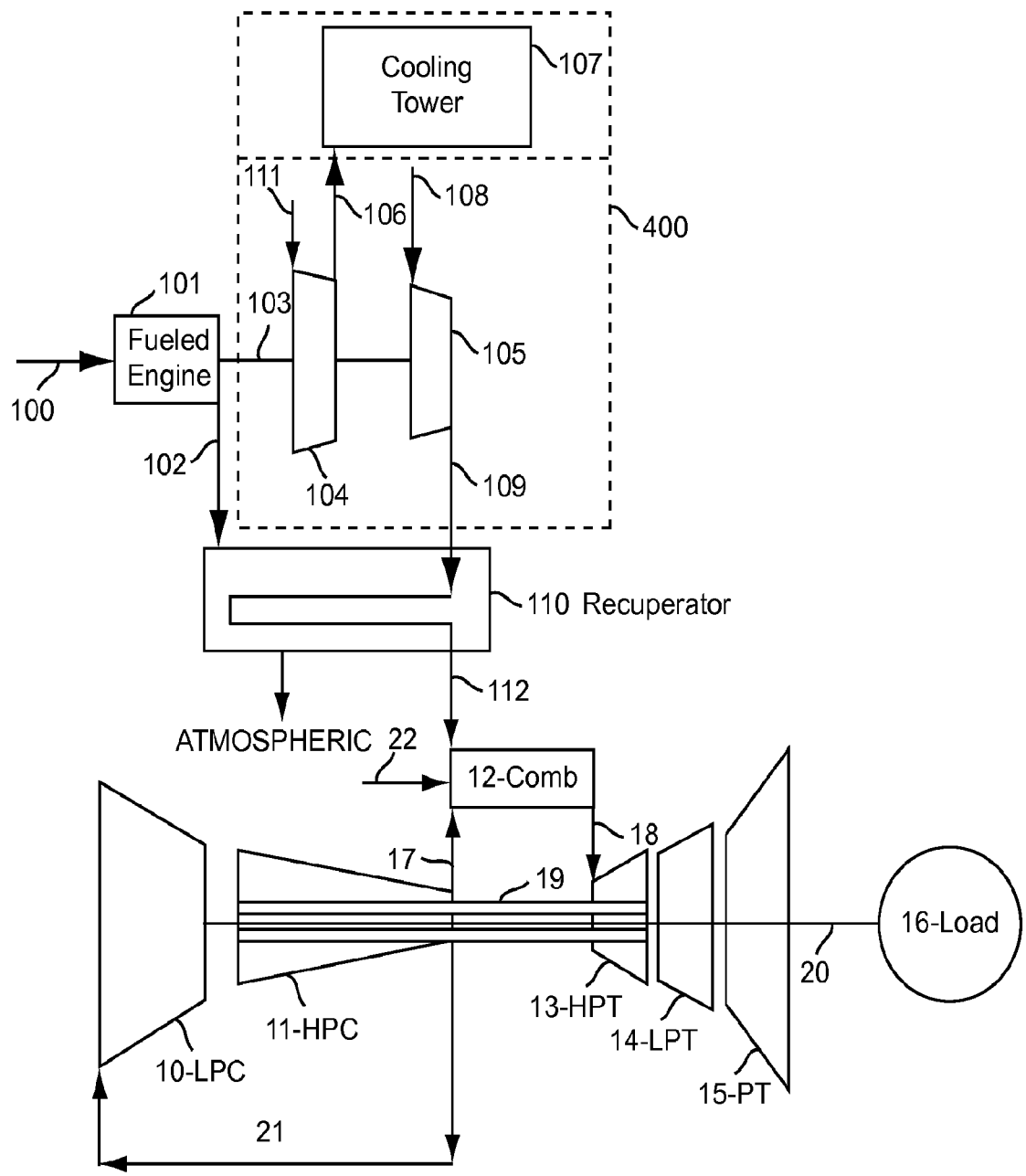
FIG. 1 is a schematic drawing of a first embodiment of the present invention including injection of compressed air from the booster system into the combustor of a multi-shaft gas turbine engine with inlet bleed heating.

One aspect of the invention relates to a method of supplementing the power output of a gas turbine system having in series a low pressure compressor, a high pressure compressor, a combustor, a high pressure turbine, and a low pressure turbine, wherein a first shaft connects the low pressure compressor and the low pressure turbine, and a second shaft connects the high pressure compressor and the high pressure turbine, the method comprising:

(i) providing a booster system having a fueled engine, and an auxiliary compressor;

(ii) operating the fueled engine to drive the auxiliary compressor to produce compressed air from the auxiliary compressor and hot exhaust gas from the fueled engine;

(iii) heating the compressed air with heat extracted from the hot exhaust gas, thereby producing hot compressed air; and (iv) injecting the hot compressed air into the gas turbine system downstream of the high pressure compressor of the gas turbine system, thereby increasing the mass flow of air therethrough and augmenting the power output of the gas turbine system.

According to one embodiment, the auxiliary compressor is a multistage compressor having at least one upstream compression stage and at least one downstream compression stage fluidly downstream of the upstream compression stage, and the step of operating the fueled engine to drive the auxiliary compressor to produce compressed air from the auxiliary compressor includes the step of cooling the compressed air exiting the upstream compression stage before delivering it to the downstream compression stage. Preferably, the step of injecting the hot compressed air into the gas turbine system downstream of the compressor of the gas turbine system includes injecting the hot compressed air into the combustor.

According to another embodiment, the step of injecting the hot compressed air into the gas turbine system downstream of the compressor of the gas turbine system includes injecting the hot compressed air into the combustor.

Another aspect of the invention relates to a method of supplementing the power output of a gas turbine system having in series a low pressure compressor, a high pressure compressor, a combustor, a high pressure turbine, and a low pressure turbine, wherein a first shaft connects the low pressure compressor and the low pressure turbine, and a second shaft connects the high pressure compressor and the high pressure turbine, the method comprising:

(i) providing a booster system having a fueled engine, and an auxiliary compressor;

(ii) operating the fueled engine to drive the auxiliary compressor to produce compressed air from the auxiliary compressor;

(iii) injecting a first portion of the compressed air into an inlet of the high pressure compressor of the gas turbine system downstream of the low pressure compressor.

According to one embodiment, the the step of injecting the first portion of the compressed air into an inlet of the high pressure compressor of the gas turbine system downstream of the low pressure compressor is preceded by the step of cooling the first portion of compressed air. Preferably, the step of operating the fueled engine to drive the auxiliary compressor to produce compressed air from the auxiliary compressor includes the step of producing hot exhaust gas from the fueled engine.

According to preferred embodiments, the step of producing hot exhaust gas from the fueled engine is followed by the step of heating a second portion of the compressed air with heat extracted from the hot exhaust gas, thereby producing hot compressed air. According to still further preferred embodiments, the method comprises the step of injecting the first portion of the compressed air into an inlet of the high pressure compressor of the gas turbine system downstream of the low pressure compressor and the step of injecting the hot compressed air into the gas turbine system downstream of the high pressure compressor. Preferably, the step of injecting the hot compressed air into the gas turbine system downstream of the high pressure compressor of the gas turbine system includes injecting the hot compressed air into the combustor.

Yet another aspect of the invention relates to an apparatus for supplementing the power output of a gas turbine system having in series a low pressure compressor, a high pressure compressor, a combustor, a high pressure turbine, and a low pressure turbine, wherein a first shaft connects the low pressure compressor and the low pressure turbine, and a second shaft connects the high pressure compressor and the high pressure turbine, the apparatus comprising:

(i) an auxiliary compressor to produce compressed air, the auxiliary compressor having at least one compressed air outlet;

(ii) a fueled engine connected to the auxiliary compressor to drive the auxiliary compressor, the fueled engine producing hot exhaust gas and having an exhaust outlet; and (iii) a recuperator having a first recuperator inlet, a second recuperator inlet, a first recuperator outlet, and a second recuperator outlet, the first recuperator inlet fluidly connected to the at least one compressed air outlet, the second recuperator inlet fluidly connected to the exhaust outlet, the first recuperator outlet fluidly connected to the first recuperator inlet and fluidly connected to the gas turbine system downstream of the high pressure compressor of the gas turbine system, and the second recuperator outlet is fluidly connected to the second recuperator inlet;

wherein heat from the hot exhaust gas is transferred to the compressed air in the recuperator prior to being injected into the gas turbine system.

According to one embodiment, the auxiliary compressor is a multistage compressor, and each stage of the multistage compressor has a stage inlet and a stage outlet. Preferably, the apparatus further comprises an intercooler heat exchanger fluidly connected to at least one of the stage inlets and at least one of the stage outlets to cool the compressed air exiting the at least one of the stage outlets prior to delivering the compressed air to the at least one of the stage inlets downstream thereof. According to one preferred embodiment, the first recuperator outlet is fluidly connected to the combustor of the gas turbine system.

Yet another aspect of the invention relates to an apparatus for providing inlet heating on a gas turbine system having in series a low pressure compressor, a high pressure compressor, a combustor, a high pressure turbine, and a low pressure turbine, wherein a first shaft connects the low pressure compressor and the low pressure turbine, and a second shaft connects the high pressure compressor and the high pressure turbine, the apparatus comprising:

(i) an auxiliary compressor to produce compressed air, the auxiliary compressor having at least one compressed air outlet;

(ii) a fueled engine connected to the auxiliary compressor to drive the auxiliary compressor, the fueled engine producing hot exhaust gas and having an exhaust outlet; and (iii) a recuperator having a first recuperator inlet, a second recuperator inlet, a first recuperator outlet, and a second recuperator outlet, the first recuperator inlet fluidly connected to the at least one compressed air outlet, the second recuperator inlet fluidly connected to the exhaust outlet, the first recuperator outlet fluidly connected to the first recuperator inlet and fluidly connected to an inlet of the low pressure compressor, and the second recuperator outlet is fluidly connected to the second recuperator inlet;

wherein heat from the hot exhaust gas is transferred to the compressed air in the recuperator prior to being injected into the gas turbine system.

Yet another aspect of the invention relates to an apparatus for supplementing the power output of a gas turbine system having in series a low pressure compressor, a high pressure compressor, a combustor, a high pressure turbine, and a low pressure turbine, wherein a first shaft connects the low pressure compressor and the low pressure turbine, and a second shaft connects the high pressure compressor and the high pressure turbine, the apparatus comprising:

(i) an auxiliary compressor to produce compressed air, the auxiliary compressor having at least one compression stage and at least one outlet of the compression stage;

(ii) a fueled engine connected to the auxiliary compressor to drive the auxiliary compressor, the fueled engine producing hot exhaust gas and having an exhaust outlet; and (iii) a cooling tower having at least one inlet and at least one outlet, the at least one inlet of the cooling tower fluidly connected to the at least one outlet of the compression stage, and the at least one outlet of the cooling tower fluidly connected to an inlet of the high pressure compressor downstream of the low pressure compressor.

A still further aspect of the invention relates to an apparatus for supplementing the power output of a gas turbine system having in series a low pressure compressor, a high pressure compressor, a combustor, a high pressure turbine, and a low pressure turbine, wherein a first shaft connects the low pressure compressor and the low pressure turbine, and a second shaft connects the high pressure compressor and the high pressure turbine, the apparatus comprising:

(i) an auxiliary compressor to produce compressed air, wherein the auxiliary compressor is a multistage compressor, and each stage of the multistage compressor has a stage inlet and a stage outlet;

(ii) a fueled engine connected to the auxiliary compressor to drive the auxiliary compressor, the fueled engine producing hot exhaust gas and having an exhaust outlet;

(iii) a cooling tower having a first inlet, a first outlet, and a second outlet, the first inlet of the cooling tower fluidly connected to one of the stage outlets, the first outlet of the cooling tower fluidly connected to one of the stage inlets, and the second outlet of the cooling tower fluidly connected to an inlet of the high pressure compressor downstream of the low pressure compressor; and (iv) a recuperator having a first recuperator inlet, a second recuperator inlet, a first recuperator outlet, and a second recuperator outlet, the first recuperator inlet fluidly connected to one of the stage outlets, the second recuperator inlet fluidly connected to the exhaust outlet, the first recuperator outlet fluidly connected to the first recuperator inlet and fluidly connected to an inlet of the gas turbine system downstream of the high pressure compressor, and the second recuperator outlet is fluidly connected to the second recuperator inlet;

wherein heat from the hot exhaust gas is transferred to the compressed air in the recuperator prior to being injected into the gas turbine system.

Preferably, the first recuperator outlet is fluidly connected to the combustor of the gas turbine system.

Yet another aspect of the invention relates to a method of providing inlet heating on a gas turbine system having in series a low pressure compressor, a high pressure compressor, a combustor, a high pressure turbine, and a low pressure turbine, wherein a first shaft connects the low pressure compressor and the low pressure turbine, and a second shaft connects the high pressure compressor and the high pressure turbine, the method comprising:

(i) providing a booster system having a fueled engine, and an auxiliary compressor;

(ii) operating the fueled engine to drive the auxiliary compressor to produce compressed air from the auxiliary compressor and hot exhaust gas from the fueled engine;

(iii) heating the compressed air with heat extracted from the hot exhaust gas, thereby producing hot compressed air; and (iv) injecting the hot compressed air into an inlet of the low pressure compressor of the gas turbine system.

FIG. 1 shows the layout for an air injection system of the present invention, referred to as "TurboPHASE", into a multi-shaft gas turbine, where the air injection system includes a recuperator 110, an auxiliary compressor 400, and a fueled engine 101 (along with a cooling tower 107 that cools the air being compressed by the auxiliary compressor 400). As used herein, the term "fueled engine" means a heat engine, such as a piston driven or rotary (e.g. Wankel) internal combustion engine (e.g. gasoline engine, diesel engine, natural gas fired engine, or similar fuels, or a combination of such fuels) or a gas turbine, that produces work by combusting a fuel with air to heat a working fluid which then drives blades or the like. The low pressure compressor 10 (referred to herein as "LPC") is connected to the low pressure turbine 14 (referred to herein as "LPT") and the power turbine 15 (referred to herein as "PT") which is also connected to the load or generator 16. The high pressure compressor 11 (referred to herein as "HPC") is connected to the high pressure turbine 13 (referred to herein as "HPT"). The HPC 11, the HPT 13, and the shaft 19 that connects them are commonly known as the "HP Core", and the balance is known as the "LP Section". The HP Core and the LP Section are fluidly connected both in the compression section (the LPC and the HPC) and in the turbine section (the HPT, LPT and PT). The combustor 12 takes the HPC pressurized air flowing from the HPC exit 17 and adds energy to the pressurized air by burning fuel in it and then returning the pressurized air to the inlet 18 of the HPT. The HP Core shaft 19 is hollow to allow the two shafts to rotate relative to each other.

The balance of the diagram in FIG. 1, items 100 to 111 inclusive, produce hot, compressed air through recuperator exit 112 to be injected into the combustor 12 in addition to the pressurized air that the gas turbine is delivering through the HPC exit 17. This hot compressed air delivered through recuperator exit 112 is generated by an auxiliary compressor 400 that is intercooled, and preferably driven by a reciprocating fueled engine 101. As shown in FIG. 1, ambient air enters the fueled engine 101 at the fueled engine intake 100, and ambient air enters auxiliary compressor 400 at the compressor inlet 111. The fueled engine 101 mechanically drives the shaft 103 of the auxiliary compressor 400. Typically there is a coupling—hydraulic, mechanical, or mechanical/hydraulic—(not shown) connected to a gearbox between the fueled engine 101 and the auxiliary compressor 400 to increase the speed of the auxiliary compressor 400 to the correct compressor inlet RPM. The coupling and the gearbox are not shown in FIG. 1 for simplicity, but as those skilled in the art will readily appreciate, would likely be included in most applications.

Figure 2:
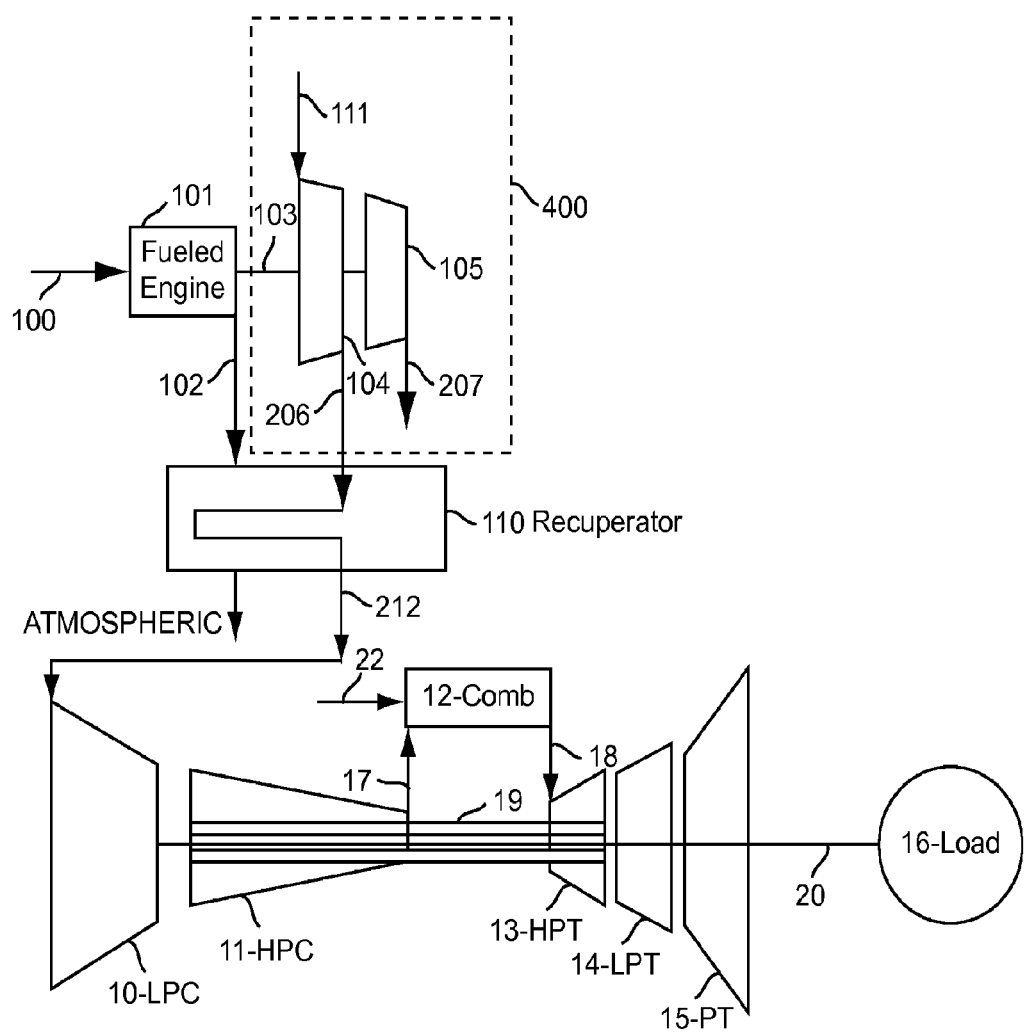
FIG. 2 is a schematic drawing of an additional embodiment of the present invention showing injection of compressed air from the booster system into an inlet of the low pressure compressor of a multi-shaft gas turbine engine to provide inlet heating.
Figure 3:
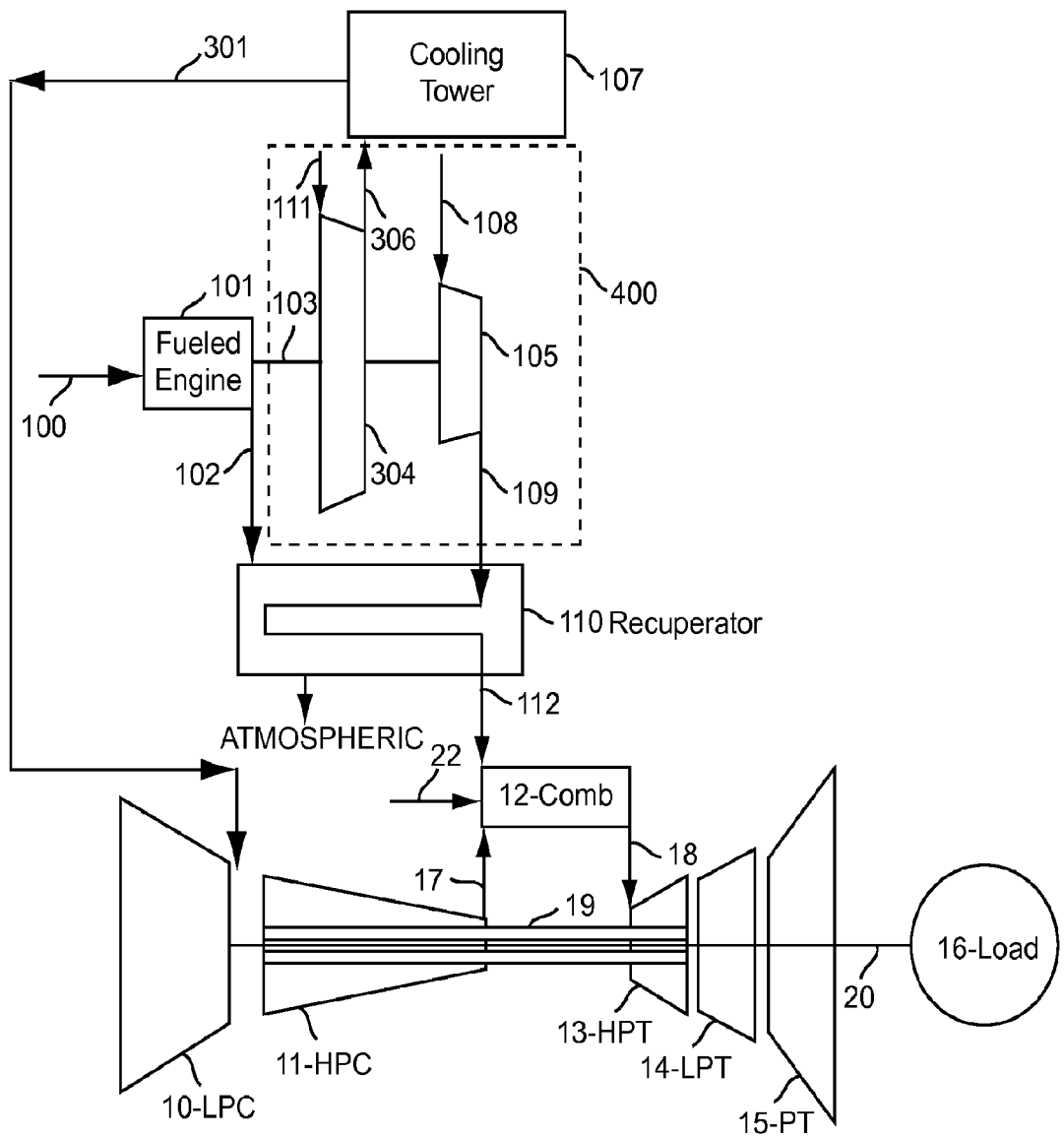
FIG. 3 is a schematic drawing of yet another alternate embodiment of the present invention showing injection of a first portion of compressed air from the booster system into an inlet of the high pressure compressor of a multi-shaft gas turbine engine, and injection of a second portion of compressed air from the booster system into the combustor of the multi-shaft gas turbine engine.

As the input shaft 103 is turned, several stages of the auxiliary compressor 400 are turned (or driven). FIG. 1 shows an exemplary two-stage auxiliary compressor 400, however, more stages may be applicable as pressure requirements vary depending on gas turbine combustor pressures. Regardless of the actual number of stages, each stage of the multistage compressor has a stage inlet (e.g. 108) and a stage outlet (e.g. 106). The air enters the first stage 104 of the multi-stage auxiliary compressor 400 through air inlet 111 and exits through first stage exit 106 at a higher pressure and subsequently a higher temperature than when it entered the first stage 104. This hotter, higher pressure compressed air then enters the intercooler, in FIG. 1 shown as a cooling tower 107, and is cooled to approximately 100 Fahrenheit (° F.). The cooling tower 107 may be a completely separate system, or a part of the existing plant cooling system. After the compressed air is cooled, the compressed air exits the cooling tower 107 through cooling tower exit and enters the inlet 108 of the second stage of the auxiliary compressor 105 where it is further compressed. As those skilled in the art will readily appreciate, the first stage 104 of the multi-stage auxiliary compressor 400 is upstream of the second stage 105 of the multi-stage auxiliary compressor 400, which is downstream of the first stage 104. Although only two stages of the auxiliary compressor 400 are shown in FIGS. 1-3 for clarity, it is to be understood that if there are additional stages in the auxiliary compressor 400, this compression and intercooling process is repeated for each stage of the multistage auxiliary compressor 400 until the desired pressure is achieved. Then the compressed air exits the auxiliary compressor 400 after the last stage of compression through the auxiliary compressor exit 109, which is connected to the inlet of the first heat transfer circuit of the recuperator 110, and enters the first heat transfer circuit of the recuperator 110. In the recuperator 110, the warm compressed air is further heated using the exhaust of the fueled engine 101 which is fed into the second heat transfer circuit of the recuperator 110 through the fueled engine exhaust path 102. The fueled engine exhaust path 102 is connected to the inlet of the second heat transfer circuit of the recuperator 110, so that the exhaust of the fueled engine flows through the second heat transfer circuit of the recuperator 110, and then exits the second heat transfer circuit of the recuperator 110 and exhausts to the atmosphere, having been cooled as a result of transferring heat to the compressed air in the first heat transfer circuit of the recuperator 110. The compressed air in the first heat transfer circuit, heated in the recuperator 110 as the result of the transfer of heat from the exhaust in the second circuit of the recuperator 110, exits the first heat transfer circuit of the the recuperator 110 through recuperator exit 112 and flows into an inlet of the combustor 12 upstream of the combustor 12 where it is added to the pressurized air flowing from the exit 17 of the HPC of the gas turbine and is entering the combustor 12 from the main compressor exit 17.

When the hot compressed air from the first heat exchange circuit of the recuperator 110 is added to the combustor 12, more fuel is added to the combustor 12 through fuel line 22 to maintain the same firing temperature as before the hot compressed air from the first heat exchange circuit of the recuperator 110 was added. As those skilled in the art will readily appreciate, the additional compressed air and fuel added to the combustor 12 provides more energy to the inlet 18 of the HPT 13, and consequently, more power is produced by the gas turbine HPT 13 which in turn spins the HP Core shaft 19 faster. This in turn induces and compresses more flow through the HPC 11, since all of the additional energy extracted by the HPT 13 is used as work in the HPC 11 because there is no external load or generator 16 attached to the HP Core shaft 19. Although the additional compressed air added to the combustor 12 from the first heat exchange circuit of the recuperator 110, and the additional fuel that is added to the combustor 12 to maintain the firing temperature, increases the RPM of the HP Core shaft 19, the LPC 10 still spins at the same RPM, since its speed is fixed by the generator, but the variable guide vanes in the LPC 10 can be adjusted to allow the LPC 10 to pass more flow. As shown in FIG. 1, the system also includes inlet bleed heating (IBH), which as one skilled in the art understands, extracts hot compressor air exiting the gas turbine compressor 17 and directs the hot compressor air through a pipe 21 to the inlet of the gas turbine to deliver the hot bleed air to the inlet of the gas turbine. The IBH and air injection system are integrated into the gas turbine together.

Figure 4:
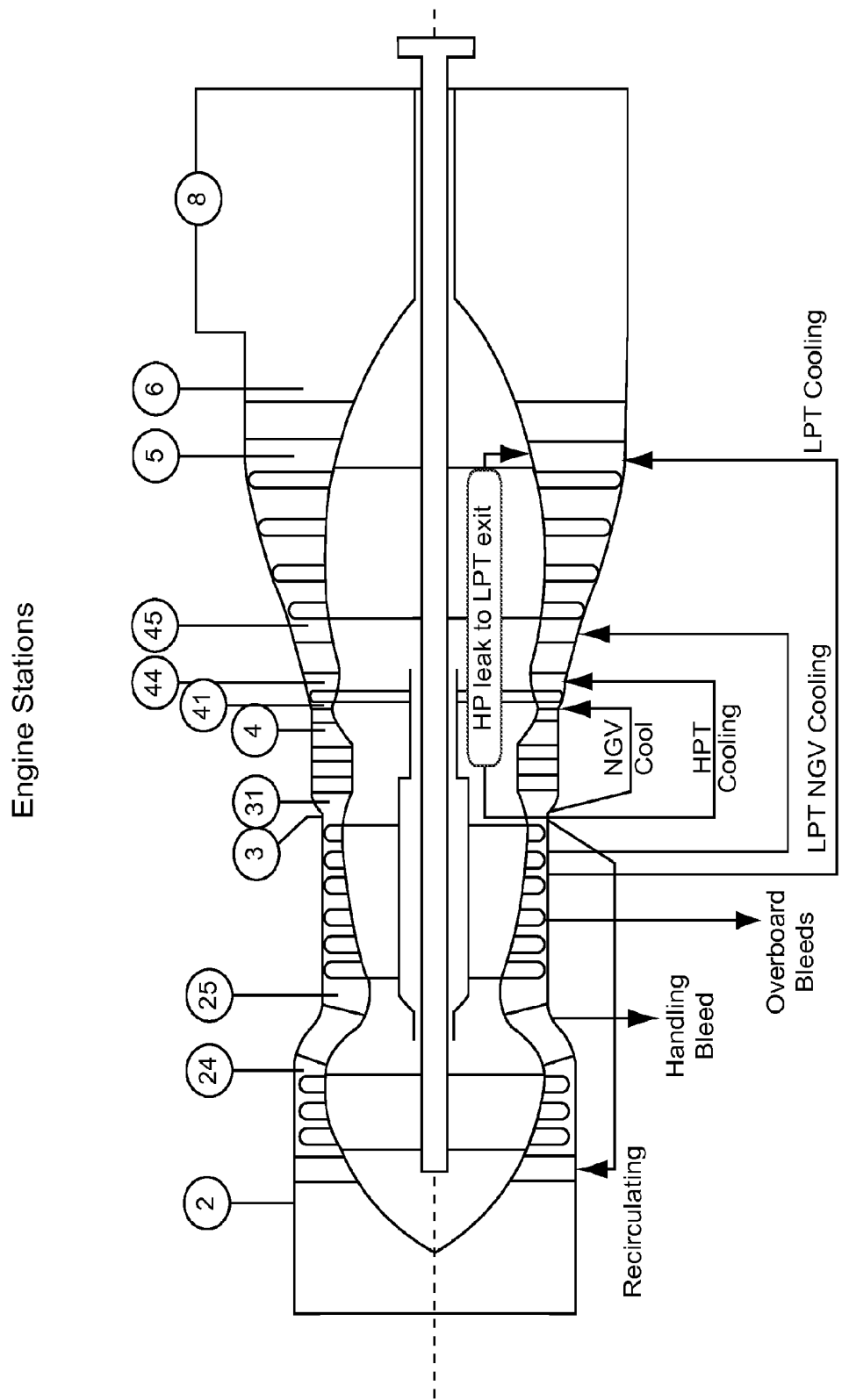
FIG. 4 is a chart showing various locations of reference points, or stations, in a typical multi-shaft gas turbine engine.

Tables 1 and 2 below shows results from a commercial software program called "GasTurb". In using GasTurb for analysis of the present invention, injection into the combustor 12 of compressed air from the first heat exchange circuit of the recuperator 110 is simulated by adding a negative bleed number for the HPC 11. The station identifications listed in Tables 1 and 2 are shown in FIG. 4. (Note: the term "TurboPHASE" as used in these tables refers to the present invention, the elements of which are identified in FIG. 1 by reference the numerals 100-112.)

TABLE 1

GasTurb program results for 14.4 lbs/sec injection into an LM6000

|  | Design | Hot Day | Hot Day w/TurboPHASE | |
| --- | --- | --- | --- | --- |
| TurboPHASE Flow (lb/s) | — | — | 14.4 | 14.4 |
| TurboPHASE Location | — | — | HPC Exit | Booster Exit |
| Power (MW) | 51.81 | 43.45 | 51.12 | 44.16 |
| Heat Rate BTU/(kWh) | 8529 | 8953 | 8156 | 8854 |
| Mass Flow (ls/s) | 306 | 270 | 296 | 273 |

TABLE 2

GasTurb program results for 14.4 lbs/sec injection into an LM6000

| | Design | | | Hot Day | | | Hot Day HPC Exit TurboPHASE 14.4 lb/s | | | Hot Day Booster Exit TurboPHASE 14.4 lb/s | | |
| --- | --- | --- | --- | --- | --- | --- | --- | --- | --- | --- | --- | --- |
| Station | W (lb/s) | T (R) | P (psia) | W (lb/s) | T (R) | P (psia) | W (lb/s) | T (R) | P (psia) | W (lb/s) | T (R) | P (psia) |
| amb |  | 519 | 14.7 |  | 555 | 14.7 |  | 555 | 14.7 | 0 | 554.67 | 14.696 |
| 1 | 300.3 | 519 | 14.7 | 265.5 | 555 | 14.7 | 275.9 | 555 | 14.7 | 254.2 | 555 | 14.7 |
| 2 | 300.3 | 519 | 14.7 | 265.5 | 555 | 14.7 | 275.9 | 555 | 14.7 | 254.2 | 555 | 14.7 |
| 24 | 300.3 | 696 | 36.7 | 265.5 | 743 | 36.4 | 275.9 | 731 | 34.7 | 254.2 | 754 | 37.7 |
| 25 | 300.3 | 696 | 36.0 | 265.5 | 743 | 35.8 | 275.9 | 731 | 34.1 | 268.5 | 754 | 37.2 |
| 3 | 297.3 | 1517 | 458.0 | 262.8 | 1549 | 406.6 | 273.2 | 1598 | 449.1 | 265.8 | 1559 | 411.1 |
| 31 | 243.3 | 1517 | 458.0 | 215.1 | 1549 | 406.6 | 237.9 | 1598 | 449.1 | 217.5 | 1559 | 411.1 |
| 4 | 248.9 | 3050 | 444.2 | 220.0 | 3050 | 394.2 | 243.2 | 3050 | 434.9 | 222.5 | 3050 | 398.5 |
| 41 | 272.9 | 2928 | 444.2 | 241.3 | 2931 | 394.2 | 265.3 | 2940 | 434.9 | 243.9 | 2931 | 398.5 |
| 43 | 272.9 | 2183 | 103.5 | 241.3 | 2196 | 92.8 | 265.3 | 2192 | 101.0 | 243.9 | 2197 | 93.8 |
| 44 | 303.0 | 2121 | 103.5 | 267.8 | 2137 | 92.8 | 292.9 | 2140 | 101.0 | 270.8 | 2139 | 93.8 |
| 45 | 303.0 | 2121 | 102.5 | 267.8 | 2137 | 91.8 | 292.9 | 2140 | 100.0 | 270.8 | 2139 | 92.8 |
| 49 | 303.0 | 1393 | 14.8 | 267.8 | 1439 | 14.8 | 292.9 | 1417 | 14.8 | 270.8 | 1437 | 14.8 |
| 5 | 306.0 | 1391 | 14.8 | 270.5 | 1437 | 14.8 | 295.7 | 1416 | 14.8 | 273.5 | 1436 | 14.8 |
| 6 | 306.0 | 1391 | 14.7 | 270.5 | 1437 | 14.7 | 295.7 | 1416 | 14.7 | 273.5 | 1436 | 14.7 |

As shown in Table 1, the power output of the gas turbine increases from 43.45 MW on a 95° F. (approximately 555 degrees Rankine, as shown in Table 2) day to 51.12 MW, an increase of 7.67 MW or 18% with an injection rate of 14.4 lbs/sec or 5.5% of the baseline hot day LPC inlet flow (station 1, 265.5 lbs/sec). Also notice in Tables 1 and 2 that the exhaust flow from the gas turbine has increased from 270 to 295.7 lbs/sec (rounded to 296), or 9.3%. The extra 3.8% is "induced" flow generated by the gas turbine HPC 11. This is significant as the cost of the TurboPHASE system (100-112 in FIG. 1) is primarily tied to the mass flow rate the system can deliver, and consequently, the effective cost from a "power delivered" standpoint, or $/kW, is improved on a gas turbine that has multiple shafts 19, 20 as compared to a single, or "fixed", shaft machine. On an F-class fixed shaft engine, such as the GE frame 7FA gas turbine engine, a TurboPHASE system adding 14.4 lbs/sec of air to the combustor could produce 5.1 additional megawatts. However, because of the induced flow and additional power it creates in a multiple shaft engine, the multiple shaft engine has an effective improvement in output of 50% with very little cost increase.

For example, the HP Core shaft 19 speed increases by approximately 1000 RPM as compared to baseline hot day RPM, and only 600 RPM compared to standard day RPM.

FIG. 2 shows an alternate embodiment of the present invention of FIG. 1, except that the cooling tower is omitted in this embodiment, and compressed air discharged from the exit 206 of the first stage 104 of the auxiliary compressor 400 is routed to the inlet of the first heat exchange circuit of the recuperator 110 instead of to the cooling tower, and the downstream stages, such as 105, are either mechanically or aerodynamically disconnected from the shaft 103 of the auxiliary compressor 400. If the downstream stages are mechanically disconnected, those stages will have zero RPM. On the other hand, if the downstream stages of the auxiliary compressor 400 are aerodynamically disconnected, those stages will maintain speed while being aerodynamically unloaded, and any air that is flowing through those stages will be discharged to the atmosphere 207. In either case, only the first stage 104 is producing the compressed air that enters the recuperator 110 and gets heated therein, so minimal energy is used to produce the compressed air that enters the first heat exchange circuit of the recuperator 110. The hot compressed air exiting the first heat exchange circuit discharge 212 of the recuperator 110 enters the inlet of the gas turbine and effectively produces inlet heating much more economically than occurs with typical gas turbine inlet heating systems.

Normally, in a gas turbine inlet heating system, air is taken, or "bled", from the compressor discharge 17 at full pressure and temperature. With preferred TurboPHASE systems, inlet heating is accomplished with a fraction of the fuel consumption, producing a significant efficiency benefit. This type of inlet heating can be accomplished on a multi-shaft gas turbine or a single shaft gas turbine. A typical gas turbine can have as much as 6% inlet bleed and almost half of the fuel entering the gas turbine is used by the gas turbine compressor to pressurize and heat the air, therefore 3% of the fuel entering the gas turbine is effectively wasted just to heat the inlet up, resulting in a 3% efficiency penalty. With the proposed system shown in FIG. 2, only ⅓ of the fuel would be required for the same mass flow of hot air, resulting in an efficiency penalty of approximately 1%, instead of 3%, for a savings of 2%.

FIG. 3 shows another alternate embodiment of FIG. 1, however, in FIG. 3, the first stage 304 of the auxiliary compressor 400 is sized to produce significantly more flow than the downstream compressor stages, such as 105. A first portion of the compressed air produced by the first stage 304 of the auxiliary compressor is extracted through a discharge line 301 after it is cooled in the cooling tower 107, and is injected into the HPC 11 downstream of the LPC 10, (this location is referred to as the "Booster Exit" in Tables 1 and 2, and is the location shown as station 25 in FIG. 4). Effectively this produces an inlet chilling effect on the HPC 11 which tends to slow the rpm of the HPT 13, a counterbalancing tool if the air injection system shown in FIG. 1 produces HP Core shaft 19 speeds that are undesirably high. A second portion of the compressed air that flows to the cooling tower 107 from the exit 306 of the first stage of the auxiliary compressor 400 is cooled and flows from an exit of the cooling tower 107 into the inlet 108 of the second stage 105 of the auxiliary compressor 400, exits via outlet 109, is then heated in the recuperator 110, and injected into the gas turbine system downstream of the HPC 11, preferably in the combustor 12.

Table 1 shows the results of 14.4 lbs/sec injection of compressed air, at approximately 283° F., at the Booster Exit. With injection of the compressed air at this point, the RPM on the HP Core shaft 19 is reduced by approximately 300 RPM. When the temperature of the compressed air injected at the Booster Exit is decreased by cooling in cooling tower 107 to 100° F. to become cool compressed air, this mixes with the 283° F. air and reduces the temperature of the air entering the HPC 11. (This cooling effect is not shown in Table 1 or 2). Therefore, with the injection of the cool compressed air (at approximately 100° F.) at the Booster Exit, the effective temperature of all of the air entering the inlet of the HPC 11 is reduced to 273° F., yielding 10° F. of inlet cooling which will further decrease the rpm of the HP Core shaft 19 while at the same time increasing the flow through the gas turbine engine by almost 2%.

As those skilled in the art will readily appreciate, the output of the gas turbine increases from the 0.71 MW improvement shown in Table 1 (44.16 MW-43.45 MW on a hot day) to almost 1.0 MW just from the injection of the 14.4 lbs/sec at the Booster Exit. On a combined injection system (i.e. one that injects 14.4 lbs/sec at the Booster Exit and injects 14.4 lbs/sec into the HPC exit 17 or combustor 12), injecting 14.4 lbs/sec of cool air into the Booster Exit and injecting 14.4 lbs/sec of hot air into the HPC exit 17 or combustor 12 (or 5.5% injection into both locations), the HP Core shaft 19 rpm remains almost constant while the gas turbine engine induces an additional 4.8% more flow through the LPC 10. This combined injection system can be balanced to control the HP Core shaft 19 rpm if required while at the same time almost doubling the flow that produces power in the turbine and generator (load). In this example, the first stage 304 of the multistage compressor 400 is flowing 28.8 lbs/sec and half of the flow is taken off after the cooling tower 107 and this cool compressed air is injected in the Booster Exit and the other half continues through the latter stages 105 of the multistage compressor 400 and is ultimately heated in the recuperator 110 and then the hot compressed air is injected into the HPC exit 17 area (i.e combustor 12 input area). The combined injection system produces 7.67 MW from the injection of hot compressed air at the HPC exit 17 (or combustor 12 inlet) and 1.0 MW from the cold compressed air injected at the Booster Exit, for a total increase of 8.67 MW.

As those skilled in the art will readily appreciate, the mass flow of the first portion of compressed air flowing from the cooling tower 107 through discharge line 301 injected at the Booster Exit may be substantially different than the mass flow of the second portion of compressed air flowing from the first heat transfer circuit of the recuperator 110 at recuperator exit 112 and preferably injected into the inlet of the combustor 12. Depending on the particular application, it may be desirable to inject most, if not all of the compressed air entering the cooling tower 107 from exit 306 of the first stage of the auxiliary compressor 400 into the inlet to the HPC 11 downstream of the LPC 10 (i.e. at the "Booster Exit").

As those skilled in the art will readily appreciate, each of the embodiments of the present invention includes flow control valves, backflow prevention valves, and shut-off valves as required to insure that the flow of air, compressed air, and exhaust flow only in the directions shown in FIGS. 1-3. While the particular systems, components, methods, and devices described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim. It will be appreciated that modifications and variations of the invention are covered by the above teachings and within the purview of the appended claims without departing from the spirit and intended scope of the invention.

The invention claimed is:

1. A method of efficiently operating a gas turbine energy system, comprising:
    (a) providing a coupled gas turbine engine having a compressor section coupled to a turbine section;
    (b) providing a booster system fluidly connected to the gas turbine engine, the booster system having a fueled engine coupled to an auxiliary compressor, a cooling system, and a recuperator;
    (c) pressurizing ambient air using the auxiliary compressor driven by the fueled engine to produce compressed air, while intercooling the compressed air between compression stages by transferring heat therefrom to the cooling system; and,
    (d) heating the compressed air in the recuperator using exhaust from only the fueled engine and then injecting the compressed air into the combustor.

2. A method of efficiently operating a gas turbine energy system, comprising:
    (a) providing a multiple shaft gas turbine engine having in series a low pressure compressor, a high pressure compressor, a combustor, a high pressure turbine, and a low pressure turbine, wherein the low pressure compressor is coupled to the low pressure turbine, and the high pressure compressor is coupled to the high pressure turbine;
    (b) providing a booster system having a fueled engine, an auxiliary compressor and a recuperator;
    (c) pressurizing ambient air using the auxiliary compressor driven by the fueled engine to produce compressed air;
    (d) heating the compressed air in the recuperator using exhaust from only the fueled engine and then injecting said compressed air into an inlet of said low pressure compressor.

3. A method of efficiently operating a gas turbine energy system, comprising:
    (a) providing a gas turbine engine having in series a low pressure compressor, a high pressure compressor, a combustor, a high pressure turbine, and a low pressure turbine, wherein the low pressure compressor is coupled to the low pressure turbine, and the high pressure compressor is coupled to the high pressure turbine;
    (b) providing a booster system having a fueled engine, an auxiliary compressor, a cooling system, and a recuperator;
    (c) pressurizing ambient air using the auxiliary compressor driven by the fueled engine to produce compressed air, while intercooling the compressed air between compression stages by transferring heat therefrom to the cooling system;
    (d) injecting a first portion of said compressed air into an inlet of said high pressure compressor, and heating a second portion of said compressed air in the recuperator using exhaust from only the fueled engine and then injecting said second portion of compressed air into said combustor.

* * * * *